United States Patent
Lessman

(10) Patent No.: US 12,536,832 B2
(45) Date of Patent: Jan. 27, 2026

(54) USER IDENTIFICATION VIA EXTENDED REALITY IMAGE CAPTURE

(71) Applicant: Hewlett-Packard Development Company, L.P., Spring, TX (US)

(72) Inventor: Mark Allen Lessman, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 336 days.

(21) Appl. No.: 18/246,477

(22) PCT Filed: Oct. 2, 2020

(86) PCT No.: PCT/US2020/053943
§ 371 (c)(1),
(2) Date: Mar. 23, 2023

(87) PCT Pub. No.: WO2022/071963
PCT Pub. Date: Apr. 7, 2022

(65) Prior Publication Data
US 2023/0368574 A1    Nov. 16, 2023

(51) Int. Cl.
*G06V 40/16*     (2022.01)
*G06F 3/01*     (2006.01)
*G06V 10/77*     (2022.01)

(52) U.S. Cl.
CPC .......... *G06V 40/171* (2022.01); *G06F 3/012* (2013.01); *G06V 10/7715* (2022.01); *G06V 40/165* (2022.01); *G06V 40/172* (2022.01)

(58) Field of Classification Search
CPC ............ G06V 40/171; G06V 10/7715; G06V 40/165; G06V 40/172; G06V 40/166; G06V 20/20; G06F 3/012; G06F 3/013; G06F 3/0346
See application file for complete search history.

(56) References Cited

U.S. PATENT DOCUMENTS

| | | | |
|---|---|---|---|
| 9,329,689 B2 | 5/2016 | Osterhout et al. | |
| 10,089,522 B2 | 10/2018 | Yu et al. | |
| 10,482,226 B1 | 11/2019 | Konrardy et al. | |
| 10,595,966 B2 | 3/2020 | Carrier, Jr. et al. | |
| 10,636,192 B1 * | 4/2020 | Saragih | G06V 40/164 |
| 2011/0150278 A1 * | 6/2011 | Shimizu | G06V 10/768 382/103 |

(Continued)

OTHER PUBLICATIONS

Jeddy et al., "Tongue prints in biometric authentication A pilot study", Journal of Oral and Maxillofacial Pathology, vol. 21, Issue 1, Apr. 5, 2017, pp. 8.

*Primary Examiner* — Wassim Mahrouka
(74) *Attorney, Agent, or Firm* — Quarles & Brady LLP

(57) ABSTRACT

In an example in accordance with the present disclosure, an extended reality system is described. The extended reality system includes an extended reality headset to be worn on a head and cover eyes of a user. An imaging device of the extended reality system captures an image of a portion of the user's face below the extended reality headset. An image analysis device of the extended reality system extracts, from the image, features of the portion of the user's face below the extended reality headset. The image analysis device also identifies the user based on a comparison between extracted features and a database of identified users.

18 Claims, 5 Drawing Sheets

(56) References Cited

U.S. PATENT DOCUMENTS

| | | |
|---|---|---|
| 2013/0278631 A1 | 10/2013 | Border et al. |
| 2016/0026253 A1 | 1/2016 | Bradski et al. |
| 2016/0055822 A1 | 2/2016 | Bell |
| 2017/0091535 A1 | 3/2017 | Yu et al. |
| 2017/0352015 A1* | 12/2017 | Xu ........................ G06V 40/113 |
| 2018/0168781 A1* | 6/2018 | Kopelman ............ G06T 19/006 |
| 2018/0373924 A1* | 12/2018 | Yoo ....................... G06V 10/454 |
| 2021/0334520 A1* | 10/2021 | Umeda ............... G06F 18/2113 |

* cited by examiner

USER IDENTIFICATION VIA EXTENDED REALITY IMAGE CAPTURE

BACKGROUND

Extended reality systems provide a digital scene of an environment or that is laid over an actual scene such that the user can interact with the extended environment. For example, a head-mounted display, using stereoscopic display devices, creates an environment that is either entirely digital or that overlays digital components over an actual environment that allows the user to interact with the digital components. Such extended reality applications can provide visual stimuli, auditory stimuli, and/or can track user movement to create a rich interactive experience.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
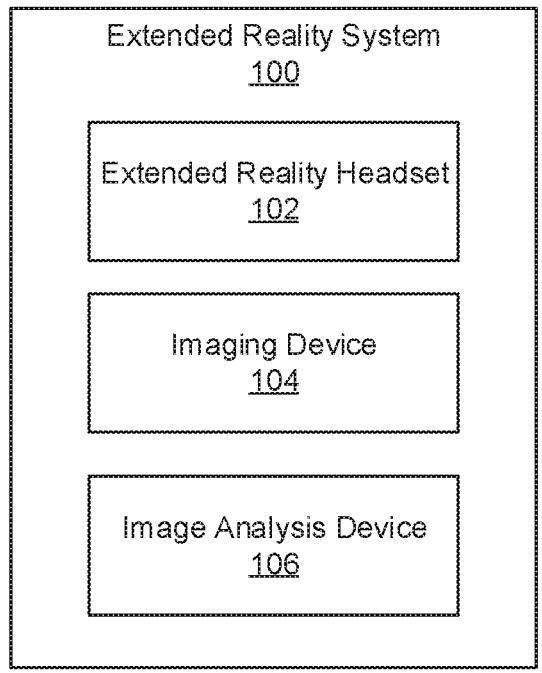
FIG. 1 is a block diagram of an extended reality system for identifying a user via image capture, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Extended reality (XR) systems create an entirely digital environment or display a real-life environment augmented with digital components. In these environments a user can interact with the extended environment. XR systems include virtual reality (VR) systems, augmented reality (AR) systems, and mixed reality (MR) systems. Such XR systems can include extended reality headsets to generate realistic images, sounds, and other human discernable sensations that simulate a user's physical presence in a virtual environment presented at the headset. A VR system includes physical spaces and/or multi-projected environments. AR systems may include those systems and devices that implement live direct and/or indirect displays of a physical, real-world environment whose elements are augmented by computer-generated sensory input such as sound, video, graphics and/or GPS data. MR systems merge real and virtual worlds to produce new environments and visualizations where physical and digital objects co-exist and interact in real time. For simplicity, VR systems, AR systems, and MR systems are referred to herein as extended reality systems.

Such extended reality systems may be used to access the information and applications as described above via an authentication process. However, XR systems present a user interface experience that is different from other computing devices in that user input devices such as a touch screen, keyboard, mouse, or finger biometric scanner may not be practical or desirable to use. For example, XR systems may rely on another computing system to login to and/or boot the XR system. Accordingly, a user may have to interface with a separate computing system before they can wear and access the XR environment. This process may be cumbersome as a user may have to remove the headset to enter authentication credentials. Specifically, a user may have to take the headset off, log in via a browser to authenticate and gain access, and don the headset again to use different applications and/or access the data. Accordingly, the present specification provides an input mechanism tailored to the XR environment. Specifically, the present specification provides an input mechanism to alleviate the reliance on an external monitor and separate computing device to identify, and in some examples authenticate, the user.

Specifically, the present specification describes a system and method used for uniquely identifying a user in an XR environment through lower facial, oral and/or dental features. Rather than relying on user input devices such as a touch screen, keyboard, mouse, or fingerprint, an image stream of the user's lower facial features is captured (without any hand interaction) using a lower face imaging and/or depth sensing device such as a camera. An image processor identifies the unique pertinent (lower facial, oral and/or dental) features of the user from the image stream to uniquely identify the user. Accordingly, the present system and methods provide a user identification operation that is more particularly tailored to the XR environment and that is more efficient than hand-based user input devices.

To identify a user through facial, oral, and dental features, the present system includes hardware components and program code. Specifically, the XR system may include an imaging and/or depth sensing device to characterize these features of the user. In some examples, the camera could be an existing integrated camera or may be added as a separate camera, either permanently or as an accessory. In some examples, the XR headset may include an illumination source. As identification is via lower face features, i.e., oral and/or dental features, the camera may have a field of view and perspective to be able to properly image the lower face of the user.

Moreover, the present specification provides security, access, and customization within the XR experience. For example, using the imaging device mounted on an XR headset and directed towards a user's face, there are many customized experiences where something customized by, or unique to, the user may be automatically selected without a manual credential or other selection scheme. Examples include account access and permission, communication channel identification (i.e. instant messaging, email, social media), user preferences such as backgrounds, sounds, shortcuts, etc., and customizations such as avatar personalization and custom environment creations.

Specifically, the present specification describes an extended reality system. The extended reality system includes an extended reality headset to be worn on a head and cover eyes of a user. An imaging device of the extended reality system captures an image of a portion of the user's face below the extended reality headset. The extended reality system also includes an image analysis device. The image analysis device 1) extracts, from the image, features of the portion of the user's face below the extended reality headset and 2) identifies the user based on a comparison between extracted features and a database of identified users.

The present specification also describes a method. According to the method, an image of a portion of the user's face below an extended reality headset of an extended reality system is captured. Features of that portion of the user's face below the extended reality headset are extracted from the image. Extracted features are compared with features in a database of identified users. The user is identified as an identified user when a threshold number of matches are found between extracted features and features in a profile of the database.

The present specification also describes a non-transitory machine-readable storage medium encoded with instructions executable by a processor. The machine-readable storage medium includes instructions to, when executed by the processor, cause the processor to 1) capture an image of a portion of the user's face below an extended reality headset of an extended reality system and 2) extract, from the image, dental features of the user. The machine-readable storage medium also includes instructions to, when executed by the processor, cause the processor to 1) identify the user based just on a comparison between extracted dental features and a database of dental features of identified users and 2) responsive to a match between the extracted dental features and dental features of identified users, execute an operation within an extended reality headset.

In summary, using such a system, method, and machine-readable storage medium may, for example, 1) expedites XR login, 2) provides a user-specific XR experience; 3) simplifies user identification in an XR environment; and 4) provides user identification and login without relying on a separate computing device for user input. However, it is contemplated that the devices disclosed herein may address other matters and deficiencies in a number of technical areas, for example.

As used in the present specification and in the appended claims, the term "a number of" or similar language is meant to be understood broadly as any positive number including 1 to infinity.

FIG. 1 is a block diagram of an extended reality system (100) for identifying a user via image capture, according to an example of the principles described herein. As described above, the extended reality system (100) generates an extended environment such as a virtual environment, a mixed environment, and/or an augmented environment. There are multiple instances where quick and easy identification of a user of an extended reality system (100) is desirable. Some examples include security and log-in features, automatic physical adjustment customization (i.e. inter-pupillary distance), and application customization (i.e. preference recall, avatars, etc.). The extended reality system (100) of the present specification uses a camera, time-of-flight camera, or other imaging device (104) which faces the user to identify the user through unique features of facial and dental origin. This could be enabled through the addition of an imaging device (104) specific to this purpose or by leveraging an existing imaging device (104) that is included for other functions in the extended reality system (100).

As a particular example, users of extended reality systems (100) range in domains from healthcare, to design, to location-based entertainment. In these use cases, users may go through an authentication process to gain access to different applications and/or data. As mentioned earlier, entry of username and password is not friction-free. In particular, in an example where a user is donning an extended reality headset, the extended reality system (100) reduces friction by identifying a user of the extended reality system (100) without requiring the user to remove the headset.

Figure 2:
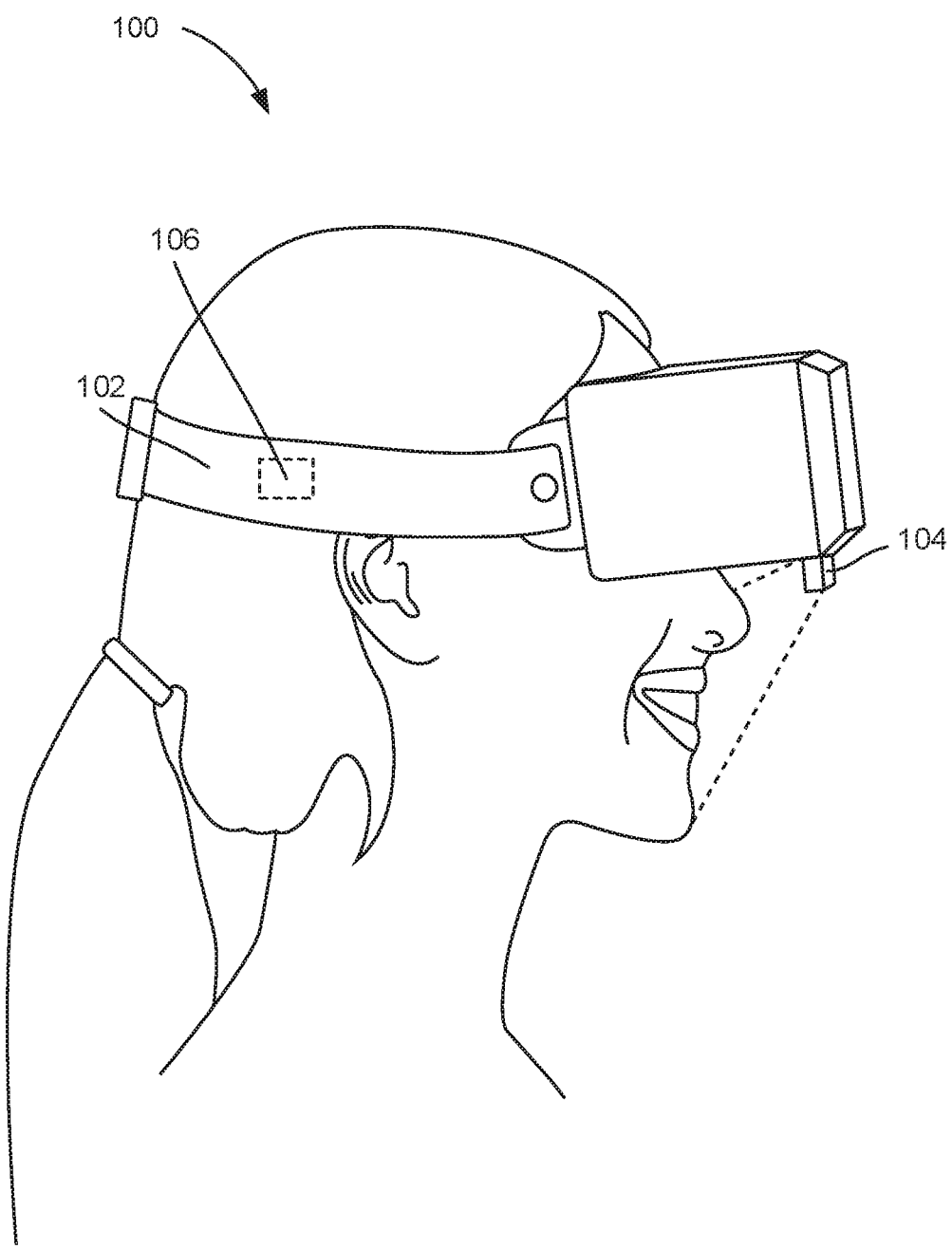
FIG. 2 is a diagram of an extended reality system for identifying a user via image capture, according to an example of the principles described herein.

The extended reality system (100) includes an extended reality headset (102) to be worn on a head of the user. Such an extended reality headset (102) covers the eyes of the user and presents the visual information in an enclosed environment formed by the extended reality headset (102) housing and the user's face. An example of such an extended reality headset (102) is depicted in FIG. 2 below.

The extended reality system (100) also includes an imaging device (104) to capture an image of a portion of the user's face below the extended reality headset (102). That is, as depicted in FIG. 2, a portion of the user's face may be covered by the extended reality headset (102). However, the portion of the user's face below the extended reality headset (102) remains uncovered and as such may be captured and used to identify the user. The imaging device (104) may have a variety of forms. In one example, the imaging device (104) is a camera that captures an image of the lower portion of the user's face which is not covered by the extended reality headset (102).

In another example, the imaging device (104) may be a time-of-flight camera. In some examples, a depth sensor imaging device (104) may be referred to as a time-of-flight camera. A time-of-flight camera uses infrared light to determine the distance of a particular object, or a particular location of an object, from the time-of-flight camera. For example, the sensor of the time-of-flight camera emits a light signal, which hits the object at a particular location and then returns to the sensor. The time it takes the light signal to bounce back is measured to provide depth-mapping information. Such a process may be repeated across a capture region to provide a depth map of the capture region. As such, the time-of-flight camera creates an image based on a distance to the object rather than its color. In some examples, such depth information may be used to uniquely identify a user.

While specific reference is made to a camera and time-of-flight camera imaging devices (104), other types of imaging devices (104) may be implemented. Moreover, in some examples, multiple imaging devices (104) may be used. For example, a camera and a time-of-flight camera may be used to capture a more complete image and representation of the user wearing the extended reality headset (102).

The extended reality system (100) also includes an image analysis device (106). The image analysis device (106) extracts, from the image, features of the portions of the user's face below the extended reality headset (102) and identifies the user based on a comparison of the extracted lower-face features of the user and a database of lower-face features of identified users. That is, rather than relying on information for an entire face of a user, the present extended reality system (100) allows for identification of the user via just lower facial, i.e., from the nose to the chin, features of the user.

That is, each individual may have unique features which distinguish the individual from other individuals. Examples include a chin shape, features of lips, shape of lips, teeth size, shape, alignment, and color, among others. Accordingly, the image analysis device (106) may extract these features from an image.

As a particular example, the image analysis device (106) may include a processor that determines a color value on a pixel-by-pixel basis to determine values for each pixel. Threshold differences between adjacent pixels may indicate a border of a facial feature. For example, the mouth of a user may have a particular shade, if a pixel value at one location is identified as having the particular shade, or within a threshold range of that shade, but an adjacent pixel has a value that is outside the threshold range, these pixels may mark the boundary of the mouth of the user. A similar pixel-by-pixel analysis may be used to determine the landmark features of a user, which landmark features refer to those features which are unique to a particular user and which may be used to distinguish the user from other users. A user may not only be identified based on the characteristics of these features, but also based on a distance between different landmark features. That is, from such a pixel-by-pixel analysis, a map of the user's lower face may be made. This map, as it is unique to the user, may be used to uniquely identify the user and potentially set up a customized XR environment and/or provide access to applications executing on the extended reality system (100).

In other words, an image of a lower part of a user's face is captured via an imaging device (104) and the image analysis device (106) reads the geometry of the user's face to identify landmark features such as a distance between teeth, etc. The image analysis device (106) may then create anchor points on the image which may be measured for relative positions between the anchor points resulting in a user signature. The exact relationship between these anchor points are unique to an individual.

This signature may then be compared to a database of known faces. When the signature matches a profile in a database, the user is identified.

That is, the image analysis device (106) identifies landmark features of the user's face from the image captured by the imaging device (104). The extended reality system (100) has access to a database, which database contains user profiles. Each user profile may include landmark feature information for a particular user. Accordingly, the image analysis device (106) may compare the measured landmark features from the image against landmark feature information from the profiles. Responsive to a match between the identified landmark features and landmark features in one of the profiles, the user may be identified as the individual associated with that profile. In one particular example, a grid could be used to compare landmark features as could feature anchor marking as described above.

In some examples, identifying landmark features of the user's face includes extracting reference points associated with landmark features and determining distances between those reference points. For example, reference points may be extracted from the image and a measured distance between those points may be used to identify landmark features. For example, distances between reference points around a tooth may be used to determine a tooth size and/or shape.

Such identification may also include extracting characteristic data for the reference points, and spaces between her reference points. For example, pixel colors at a particular location may be used to indicate a tooth color. Other examples of characteristic data that is extracted includes pixel depth and pixel location. This information may be used to further map the landmark features. For example, depth information for reach reference point around a tooth may be used to determine a rotation of the tooth.

The image analysis device (106) therefore identifies the user based on a comparison of the extracted information and a database of information of known users. That is, the image analysis device (106) may compare extracted information related to landmark features on a lower portion of a user's face and compare it to a database that includes information related to landmark features of known users. If the extracted information matches an entry in the database, the user is authorized and any number of operations may be executed. In some examples, this identification may occur in the extended reality headset (102). That is, the image analysis device (106) may be disposed on the extended reality headset (102). In another example, the identification may occur away from the extended reality headset (102). That is, the image data may be sent to an external device for identification of the user.

In an example, the extended reality headset (102) may be trained to identify a user. That is, the extended reality system (100) may include a training application to instruct the extended reality system (100) how to identify a user. Once trained, the extended reality headset (102) may be able to identify the users.

In one particular example, the image analysis device (106) identifies the user based exclusively on oral features extracted from the image. In yet another example, the image analysis device (106) identifies the user based exclusively on dental features extracted from the image. That is, each user may have unique dental features which may be used to identify that user. Given that a user's teeth are below the display headset (102), identification may be made of the user without requiring the user to remove the headset (102) during authentication. Specific examples of dental features that may be relied on to identify a user include variations in shape and size, restorative work, pathologies, wear patterns, teeth crowding, teeth color and position and other unique identifying features.

In one particular example, the identification of the user may be based on additional non-facial feature information. For example, other information such as a voice recognition of the user may be used to provide a more unique and infallible identification of the user.

As described above, a number of operations may be executed responsive to a positive dental identification. As one example, a match between extracted information and stored information may be used to authenticate a user before the user is allowed to access certain information and/or applications.

In another example, a match may be used to provide certain physical adjustment customizations within the XR environment. For example, each user may have a different inter-pupillary distance which may result in different users viewing the XR environment differently. Accordingly, the XR display may be calibrated based on a user's inter-pupillary distance. Accordingly, once identified, certain physical characteristics of a user, such as their inter-pupillary distance, may be extracted from the database such that the XR environment may be adjusted to match the user's inter-pupillary distance.

As another example, application customizations may be loaded. For example, each user may have application preferences such as communication contact lists, user interface colors, operating system sounds and shortcuts, etc. Accordingly, once a user is identified via their lower facial features, such customizations may be loaded to provide the user with the user-specific customized environment.

As used in the present specification and in the appended claims, the term, "image analysis device" refers to various hardware components, which include a processor and memory. The processor includes the circuitry to retrieve executable code from the memory and execute the executable code. As specific examples, the image analysis device as described herein may include computer-readable storage medium, computer-readable storage medium and a processor, an application-specific integrated circuit (ASIC), a semiconductor-based microprocessor, a central processing unit (CPU), and a field-programmable gate array (FPGA), and/or other hardware device.

The memory may include a computer-readable storage medium, which computer-readable storage medium may contain, or store computer-usable program code for use by or in connection with an instruction execution system, apparatus, or device. The memory may take many types of memory including volatile and non-volatile memory. For example, the memory may include Random Access Memory (RAM), Read Only Memory (ROM), optical memory disks, and magnetic disks, among others. The executable code may, when executed by the respective component, cause the component to implement at least the functionality described herein.

FIG. 2 is a diagram of an extended reality system (100) for identifying a user via image capture, according to an example of the principles described herein. As described above, in some examples the extended reality system (100) includes an extended reality headset (102) that is worn by a user to generate visual, auditory, and other sensory environments, to detect user input, and to manipulate the environments based on the user input. While FIG. 2 depicts a particular configuration of the extended reality system (100), any type of extended reality system (100) may be used in accordance with the principles described herein.

In this example, the extended reality headset (102) is communicatively coupled to a processor and computer readable program code executable by the processor which causes a view of an extended reality environment to be displayed in the extended reality headset (102). In some examples, the extended reality headset (102) implements a stereoscopic head-mounted display that provides separate images for each eye of the user. In some examples, the extended reality headset (102) may provide stereo sound to the user. In an example, the extended reality headset (102) may include a head motion tracking sensor that includes a gyroscope and/or an accelerometer. The extended reality headset (102) may also include an eye tracking sensor to track the eye movement of the user of the extended reality headset (102).

FIG. 2 also depicts the image analysis device (106). In FIG. 2, the image analysis device (106) is depicted in a dashed box indicating the image analysis device (106) is disposed within the extended reality headset (102). While FIG. 2 depict this image analysis device (106) formed on the extended reality headset (102), the image analysis device (106) may be placed on another device. For example, the image analysis device (106) may be found on a different computing device.

FIG. 2 also clearly depicts the imaging device (104). In the example depicted in FIG. 2, the imaging device (104) is a camera to capture an image of a lower portion of a user's face. In this example, the imaging device (104) may be integrated into a housing of the extended reality headset (102). That is, rather than being a separate component, the imaging device (104) may be attached to the extended reality headset (102) and directed towards the lower face of the user. In some examples, the imaging device (104) may also extend below the housing of the extended reality headset (102) as so doing provides a capture region of the lower portion of the user's face.

In an example, the imaging device may further include an illumination source directed towards the face of the user. The illumination source may provide additional illumination to the lower portion of the user's face during image/video capture. The additional illumination increases the likelihood of an accurate and reliable user identification operation. That is, as it is below the extended reality headset (102) and may be used in a low-light environment, the imaging device (104) may not have enough ambient light to generate an image with high enough resolution and clarity to identify the user. The illumination source provides the additional illumination such that accurate landmark features may be extracted from the image and that an accurate and correct identification of the user may be made based on the information extracted from the image.

Figure 3:
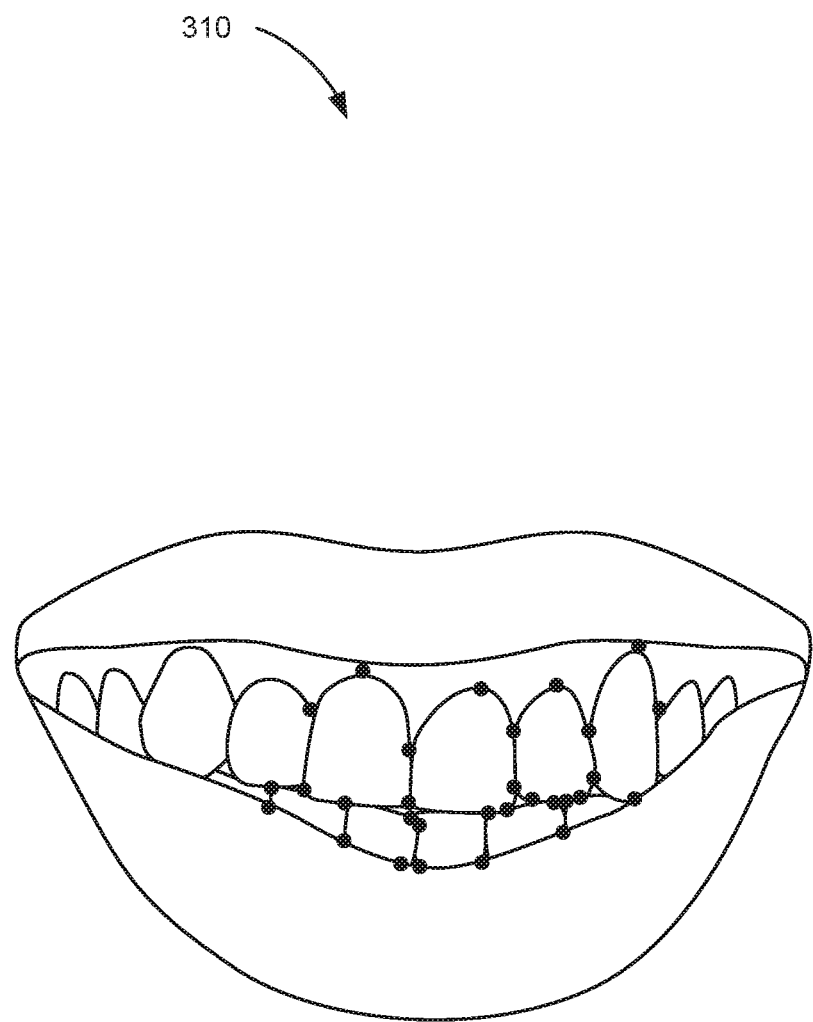
FIG. 3 is a diagram of user extended reality identification via dental and oral feature capture and extraction, according to an example of the principles described herein.

FIG. 3 is a diagram of user extended reality identification via dental feature capture and extraction, according to an example of the principles described herein. Specifically, FIG. 3 is an example of an image (310) of a user's mouth and teeth. As noted above, the shape and arrangement of teeth may be unique to an individual, with no two individuals having the same dental features. Accordingly, dental features may provide a reliable feature upon which user identification may be made.

FIG. 3 also depicts a few examples of landmark feature marking. That is, each circle may indicate a landmark feature, such as a border of a particular tooth that may be extracted and may act as an anchor point for comparison to other anchor points to determine the features of the teeth, such as the tooth shape and relative positioning of adjacent teeth. To identify the user, a threshold number of landmark features may be matched between the user and the database of identified users. For example, for any number of reasons, the landmark features extracted from image data may not exactly match the landmark features used in the database of identified users. As a particular example, the extracted image data may be from a different angle than the image data in the database. In this example, while not an exact match, if a threshold number of landmark features match between the extracted image data and the database data, the user may be identified as one of the users with a profile in the database.

As one example, a bite pattern, or overall arrangement of a user's teeth may be used to identify a user. That, is the overlap, alignment, bite area, of a user's teeth may be unique to that user and therefore a reliable mechanism for identifying that user.

As another example, the angle of the teeth may be used to identify a user. Another example of a dental feature that may be relied on to unique identify a user is the alignment of teeth. That is, for each user, a top row of teeth may align differently with the bottom row of teeth. More specifically, each tooth on the top row may align differently with respect to corresponding teeth on the bottom row. Such an alignment between individual teeth may extracted by the image analysis device (FIG. 1, 106) and may be used to uniquely identify the user.

As yet another example, the presence or absence of certain teeth may be determined by the image analysis device (FIG. 1, 106) and used to uniquely identify a user. While specific reference is made to a few dental features that may be extracted by the image analysis device (FIG. 1, 106) and used to uniquely identify a user, other features may be relied on as well including, a tooth shape and size, whether a tooth has a flat surface indicating it is worn down, a tooth color, teeth spacing, relative position to other teeth, and relative height compared to other teeth.

As one further example, the image analysis device (FIG. 1, 106) may identify dental work performed on a user's teeth to uniquely identify a user. For example, a filling of a cavity may be made of a different material than the tooth itself and may therefore have different characteristics which are distinguishable by the image analysis device (FIG. 1, 106). In some examples, all or a subset of these features may be used to identify a user. For example, the database may include data relating to a set of dental features and a randomized subset of that set may be selected as features by which a user is to be identified. Randomly selecting a subset of features to use for user identification prevents a malicious user from impersonating the user.

In one particular example, a grid may be laid over the image data. From the grid, locations of landmark features may be determined. Relative angles and distances between different landmark features may also be determined based on the grid laid over the image data.

As described above, the image analysis device (FIG. 1, 106) may analyze an image to determine just the dental features and the database may include information relating to just dental features of identified users. Accordingly, a user may be identified entirely based on dental feature analysis of a collected image. As such, the user may be granted access to applications and/or customizations applied based solely on an identification of the user via their dental features.

Figure 4:
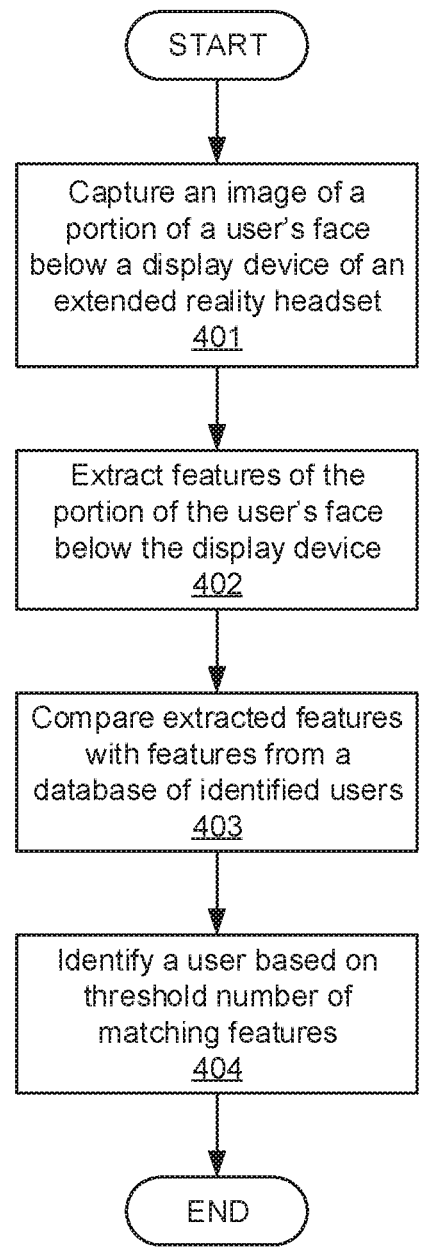
FIG. 4 is a flowchart of a method for extended reality identification via dental feature capture and extraction, according to an example of the principles described herein.

FIG. 4 is a flowchart of a method (400) for extended reality identification via dental feature capture and extraction, according to an example of the principles described herein. As described above, the method (400) includes capturing (block 401) an image of a portion of the user's face below an extended reality headset (FIG. 1, 102) of an extended reality system (FIG. 1, 100). Features are extracted (block 402) from the image, and specifically features of the portion of the user's face below the extended reality headset (FIG. 1, 102) are extracted.

Based on the imaging device (FIG. 1, 104) used, the extraction may take different forms. For example, when the imaging device (FIG. 1, 104) is a camera (FIG. 2, 208), the extraction (block 402) may include identifying landmark features of the portion of the user's face below the extended reality headset (FIG. 1, 102) and identifying distances between the landmark features. For example, where the identification is based solely on a user's teeth, the landmark features may include the shape and size of each individual tooth and the distance between each tooth. In such an example, for each landmark feature, at least one of a feature location, feature color, feature shape, and feature size may be determined. That is, each tooth in a user's mouth may be a unique feature as compared to the teeth of other users and the unique nature of each tooth presents a separate data point that may be used to uniquely identify a user. For example, tooth location, color, shape, and size may be calculated for each tooth, thus providing a number of data points to unique identify that user. Additionally, the distance of each tooth to adjacent teeth may indicate a rotation, alignment, and/or relative position of each tooth relative to adjacent teeth, thus providing even more data points by which a user may be uniquely identified from a database of known users.

When the imaging device (FIG. 1, 104) is a time-of-flight camera, extracting (block 402) features of the portion of the user's face below the extended reality headset (FIG. 1, 102) includes determining a distance between the imaging device (FIG. 1, 104) and landmark features of the portion of the user's face below the extended reality headset (FIG. 1, 102). That is, the time-of-flight camera may be used to present a distance image, as opposed to a colored image, of the user's dental features.

Extracted features are compared (block 403) with features from a database of identified users. That is, the database may include profiles, each pertaining to a different identified user and each including feature information for the user associated with that profile. The extracted landmark feature information may be compared (block 403) with landmark feature information from the various profiles in the database.

Based on a threshold number of matches, the user may be identified (block 404) as an identified user. That is, each extracted landmark feature may not match up with each landmark feature in a profile due to any number of circumstances, such as hidden teeth, differing camera angles, etc. However, when a threshold number of matches are found between extracted landmark features and landmark features in a profile, a user may be identified as the individual associated with the profile.

As described above, once a user is identified, any number of operations can be executed. For example, responsive to a match between extracted dental features and dental features of identified users, the XR system (FIG. 1,100) may grant access to the user based on an identify of the user and user access rights associated with the user. As another example, responsive to a match between the extracted dental features and dental features of identified users, the XR system (FIG. 1, 100) may alter a display of an extended reality environment, for example, by implementing physical feature-based calibrations to the extended reality environment.

As another example, responsive to a match between the extracted dental features and dental features of identified users, the system may load user specific preferences. Examples include contact lists, display preferences, and other user interface preferences.

Figure 5:
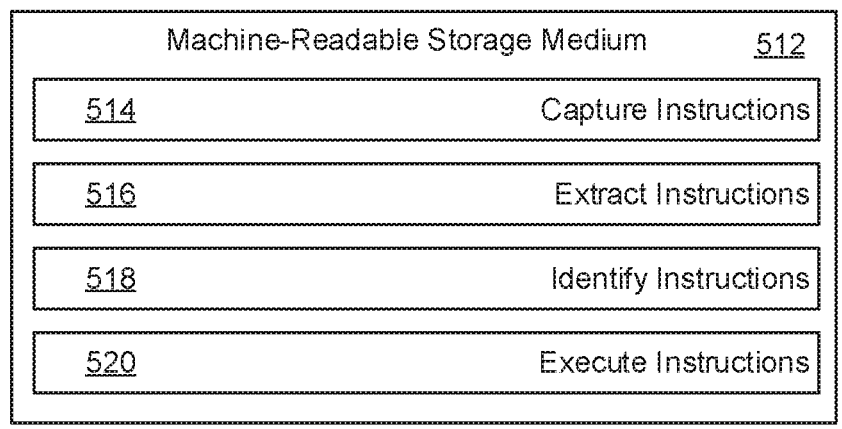
FIG. 5 depicts a non-transitory machine-readable storage medium for extended reality identification via dental feature capture and extraction, according to an example of the principles described herein.

FIG. 5 depicts a non-transitory machine-readable storage medium (512) for extended reality identification via dental feature capture and extraction, according to an example of the principles described herein. To achieve its desired functionality, an extended reality system (FIG. 1, 100) includes various hardware components. Specifically, an extended reality system (FIG. 1, 100) includes a processor and a machine-readable storage medium (512). The machine-readable storage medium (512) is communicatively coupled to the processor. The machine-readable storage medium (512) includes a number of instructions (514, 516, 518, 520) for performing a designated function. In some examples, the instructions may be machine code and/or script code.

The machine-readable storage medium (512) causes the processor to execute the designated function of the instructions (514, 516, 518, 520). The machine-readable storage medium (512) can store data, programs, instructions, or any other machine-readable data that can be utilized to operate the extended reality system (FIG. 1, 100). Machine-readable storage medium (512) can store machine readable instructions that the processor of the extended reality system (FIG. 1, 100) can process, or execute. The machine-readable storage medium (512) can be an electronic, magnetic, optical, or other physical storage device that contains or stores executable instructions. Machine-readable storage medium (724512 may be, for example, Random-Access Memory (RAM), an Electrically Erasable Programmable Read-Only Memory (EEPROM), a storage device, an optical disc, etc. The machine-readable storage medium (512) may be a non-transitory machine-readable storage medium (512).

Referring to FIG. 5, capture instructions (514), when executed by the processor, cause the processor to, capture an image of a portion of the user's face below an extended reality headset (FIG. 1, 102) of an extended reality system (FIG. 1, 100). Extract instructions (516), when executed by the processor, cause the processor to, extract from the image dental features of the user.

Identify instructions (518), when executed by the processor, cause the processor to, identify the user based just on a comparison between extracted dental features and a database of dental features of identified users. Execute instructions (520), when executed by the processor, cause the processor to, responsive to a match between the extracted dental features and dental features of identified users, execute an operation within the extended reality environment.

In summary, using such a system, method, and machine-readable storage medium may, for example, 1) expedites XR login, 2) provides a user-specific XR experience; 3) simplifies user identification in an XR environment; and 4) provides user identification and login without relying on a separate computing device for user input. However, it is contemplated that the devices disclosed herein may address other matters and deficiencies in a number of technical areas, for example.

What is claimed is:

1. An extended reality system, comprising:
    an extended reality headset to be worn on a head and cover eyes of a user;
    an imaging device to capture an image of a portion of the user's face below the extended reality headset; and
    an image analysis device to:
        extract, from the image, features of the portion of the user's face below the extended reality headset;
        identify the user based on a comparison between characteristics of individual extracted features and a database of identified users;
        generate a user signature based on a relationship among the extracted features;
        determine a user profile in the database that matches the user signature; and
        identify the user as corresponding to the user profile.

2. The extended reality system of claim 1, wherein the image analysis device is to:
    identify landmark features of the user's face from the image;
    identify a user profile from a database that has similar landmark features as the identified landmark features; and
    responsive to a match between profile landmark features and identified landmark features, identify the user as a user associated with the user profile.

3. The extended reality system of claim 2, wherein identifying landmark features of the user's face comprises:
    extracting reference points associated with one or more of the landmark features;
    determining distances between reference points to identify distances between landmark features; and
    extracting characteristic data for each reference point.

4. The extended reality system of claim 3, wherein the characteristic data is selected from the group consisting of:
    pixel color;
    pixel depth; and
    pixel location.

5. The extended reality system of claim 1, wherein the imaging device is integrated into a housing of the extended reality headset below the housing.

6. The extended reality system of claim 1, wherein the imaging device is selected from the group consisting of a camera and a time-of-flight camera.

7. The extended reality system of claim 1, further comprising an illumination source directed towards the face of the user.

8. The extended reality system of claim 1, wherein the image analysis device identifies the user based exclusively on characteristics of oral features extracted from the image.

9. The extended reality system of claim 1, wherein the image analysis device identifies the user based exclusively on characteristics of dental features extracted from the image.

10. A method, comprising:
    capturing an image of a portion of the user's face below an extended reality headset of an extended reality system;
    extracting, based on a pixel-by-pixel analysis of image data of the image, features of the portion of the user's face below the extended reality headset, wherein the extracting comprises determining a distance between an imaging device and landmark features of the portion of the user's face below the extended reality headset;
    comparing characteristics of individual ones of the features extracted from the image with features in a database of identified users; and
    identifying the user as an identified user based on a threshold number of extracted features matching features of a profile in the database.

11. The method of claim 10, wherein extracting features of the portion of the user's face below the extended reality headset comprises identifying landmark features of the portion of the user's face below the extended reality headset.

12. The method of claim 11, further comprising, determining, for each landmark feature, at least one of a feature location, a feature color, a feature shape, and a feature size.

13. A non-transitory machine-readable storage medium encoded with instructions executable by a processor, the machine-readable storage medium comprising instructions to, when executed by the processor, cause the processor to:
    capturing an image of a portion of the user's face below an extended reality headset of an extended reality system;
    extract, based on a pixel-by-pixel analysis of image data of the image, dental features of the user;
    identify the user based just on a comparison between extracted dental features and a database of dental features of identified users; and
    responsive to a match between the extracted dental features and dental features of identified users, execute an operation within an extended reality environment.

14. The non-transitory machine-readable storage of claim 13, comprising instructions to, when executed by the processor, cause the processor to, responsive to a match between the extracted dental features and dental features of identified users:
    grant access to the user based on an identity of the user and user access rights associated with the user;
    alter a display of the extended reality environment; or
    load user-specific preferences.

15. The extended reality system of claim 1, wherein the image analysis device is further to identify the user based on a comparison between distances between different extracted features and the database of identified users.

16. The method of claim 10, wherein identifying the user is based exclusively on characteristics of dental or oral features extracted from the image.

17. The method of claim 10, further comprising:
comparing distances between different ones of the features extracted from the image with features in the database of identified users.

18. The non-transitory machine-readable storage medium of claim 13, wherein the dental features include at least one of a variation in shape, a variation in size, a restorative work, a pathology, a wear pattern, a teeth crowding, a teeth color, or a teeth position.

* * * * *